Fig. 1A

May 2, 1950 V. W. LEONARD 2,506,368
VEHICLE ACTUATED TRAFFIC CONTROLLER
Filed Dec. 24, 1946 3 Sheets-Sheet 2

Fig. 1B

Inventor:
Vincent W. Leonard,
by Claude L. Metz
His Attorney.

May 2, 1950

V. W. LEONARD 2,506,368

VEHICLE ACTUATED TRAFFIC CONTROLLER

Filed Dec. 24, 1946

Inventor:
Vincent W. Leonard,
by Claude H. Mott
His Attorney.

Patented May 2, 1950

2,506,368

UNITED STATES PATENT OFFICE 2,506,368

VEHICLE ACTUATED TRAFFIC CONTROLLER

Vincent W. Leonard, Saugus, Mass., assignor to General Electric Company, a corporation of New York Application December 24, 1946, Serial No. 718,180

28 Claims. (Cl. 177—337)

My invention relates to traffic signal control systems, and more particularly to vehicle actuated traffic signal control systems and apparatus therefor.

It is a general object of my invention to provide a new and improved vehicle actuated traffic signal control system.

It is a further object of the invention to provide a vehicle actuated traffic signal control apparatus which is manually adjustable to provide a plurality of selectable modes of operation.

It is a still further object of the invention to provide a vehicle actuated traffic signal control apparatus comprising a rotatable signal program controller having a plurality of positions of rest corresponding to predetermined conditions of signal indication, and means responsive to the approach of a vehicle for permitting intermittent movement of said controller between said positions to alternate, maintain and extend the various signal indications.

It is another object of my invention to provide a vehicle actuated traffic signal control apparatus comprising a rotatable signal program controller including electric braking means, and detector means for controlling the braking means to permit intermittent rotation of the controller in accordance with vehicle actuation.

Another object of my invention is the provision of a vehicle actuated traffic signal control system comprising a rotatable signal program controller having positions of rest corresponding to a right-of-way indication on each controlled traffic lane, in combination with new and novel means responsive to approaching vehicles for intermittently releasing said controller for movement between said positions in accordance with traffic conditions.

A further object of the invention is the provision of a rotatable signal program controller arranged for normal continuous rotation, in combination with new and novel means for intermittently stopping rotation of the controller in response to vehicle actuation.

It is still another object of the invention to provide a vehicle actuated traffic signal control apparatus which, by simple switching adjustment, may be made to operate either as a pre-timed controller with right-of-way extension by vehicles approaching a go signal, or as a full actuated controller with the go signal remaining upon the traffic lane last called, or as a full actuated controller with the go signal normally returning to and remaining on any selected lane in the absence of actuation, or as a part-actuated controller with or without recall to the street having the detector, or as a manually operated controller.

Another object of the invention is the provision of a new and novel vehicle actuated traffic signal control apparatus comprising a rotatable signal program controller of the pre-timed type normally intermittently operated in response to the approach of vehicles and provided with separate electronic interval timing apparatus removable as a unit without interfering with the ability of the program controller to operate continuously as a pre-timed controller.

My invention will be more fully understood and its various objects and advantages further appreciated by referring now to the illustrative embodiment described in the following detailed specification and accompanying drawings, in which Figs. 1A and 1B, taken together as Fig. 1, show a schematic circuit diagram of a vehicle actuated traffic signal control system embodying my invention.

Figure 1A:
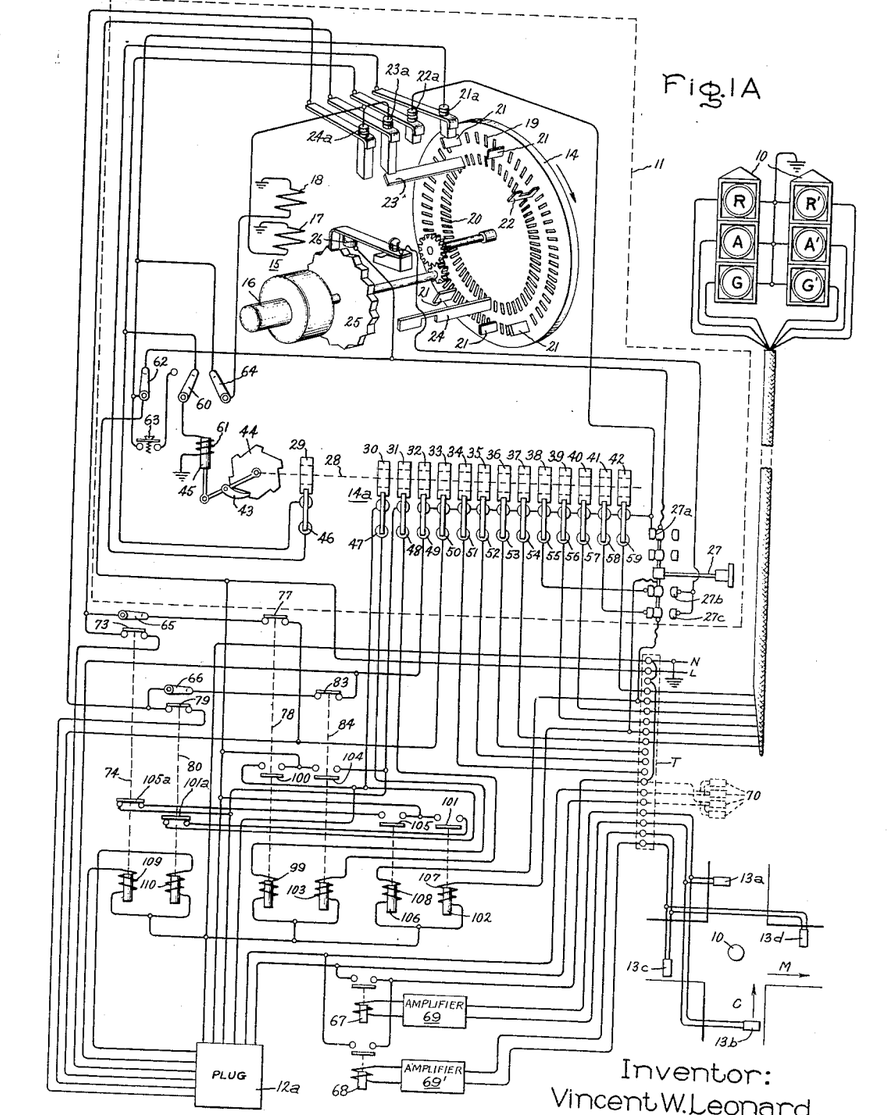
Figure 1B:
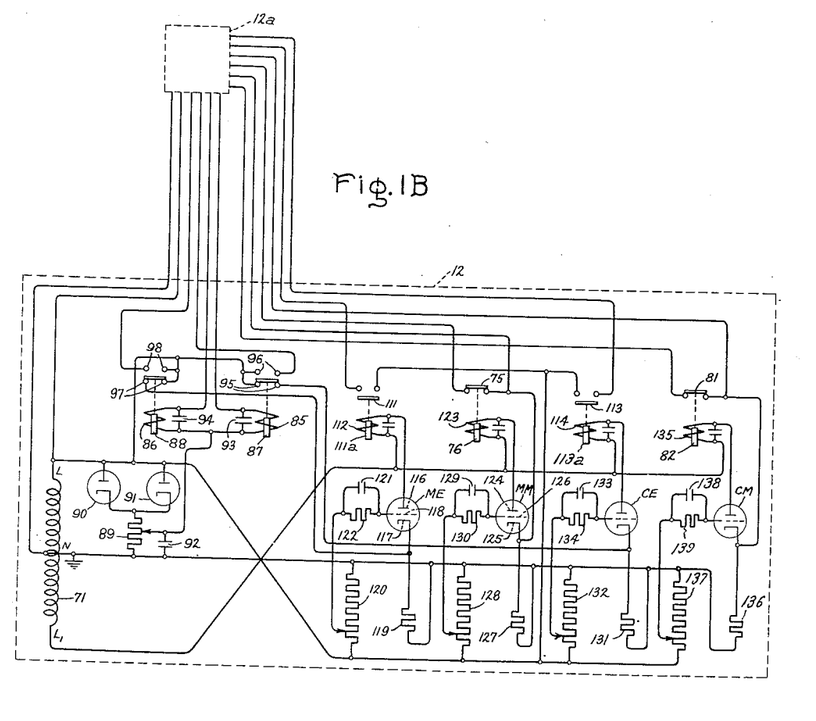

Referring now to the drawings, and particularly to Figs. 1, I have shown therein a vehicle actuated traffic signal control system comprising a signal device 10 of the type comprising a red, amber and green indicating light for each intersecting traffic lane, a traffic signal program controller 11 for controlling the signal device 10, an electronic interval timing unit 12 (Fig. 1B) and a plurality of vehicle actuable detector units 13a, 13b, 13c and 13d, one pair for each of two intersecting traffic lanes M and C. While my invention is equally applicable to the control of multiple intersections of three or more lanes or streets, I have shown by way of illustration only an embodiment arranged to control a single pair of intersecting streets M and C. The street M may be regarded as a main thoroughfare and the street C as a cross street.

The interval timing unit of Fig. 1B connects to the controller of Fig. 1A by a single plug connector 12a. The two figures fit together simply by superposing the connector 12a of Fig. 1B on the connector 12a of Fig. 1A, the aligned vertical and horizontal wires on opposite sides of the plug being then respectively connected within the plug.

The signal program controller 11 is generally similar in construction to that described and claimed in Patents 2,236,297; 2,236,298 and 2,236,299 issued to Ralph A. Reid on March 25, 1941. Briefly, this controller comprises a rotatable timing dial 14 and a signal drum 14a. The timing dial 14 is driven by a synchronous timing motor 15 having an armature 16 and a pair of mutually opposed field exciting windings 17 and 18. For motor operation the field 18 only is energized. When it is desired to stop the motor the opposing winding 17 is also energized, so that the field winding 17 will be referred to hereinafter as the braking field or braking coil. The timing dial 14 is provided with two concentric rows of radial slots 19 and 20. In the slots 19 and 20 are positioned a plurality of contact actuating keys 21, 22, 23 and 24 arranged to cooperate with a plurality of pairs of dial contacts 21a, 22a, 23a and 24a, respectively. The dial contacts are mounted upon the controller base (not shown) adjacent the timing dial 14.

All the dial contacts 21a to 24a, inclusive, are normally open and are closed only when engaged by one of the actuating keys in the dial. The contacts 21a are recurrently closed by the keys 21 in the outer row of slots 19 of the timing dial. The contacts 22a are closed once per revolution per cycle of the timing dial 14 by the key 22 positioned in the outer row of slots but apertured to avoid engagement with the contacts 21a. The contacts 23a are closed once per cycle by the key 23 in the inner row of slots of the timing dial, while the contacts 24a are closed once per cycle of the dial 14 by the longer key 24 positioned in the inner row of slots and apertured to avoid engagement with the contacts 23a. The motor shaft also carries a toothed cam 25 arranged recurrently to actuate a pair of flasher contacts 26. The contacts 26 operate in conjunction with a manual transfer switch 27 to produce continuous flashing operation of the amber lamps in the signal device 10 whenever the switch 27 is manually set for such operation. In the position shown the switch 27 is set for sequential red, amber and green signal indication.

The signal drum 14a comprises a rotatable cam shaft 28 carrying a plurality of cams 29 to 42 inclusive, and is advanced intermittently through a pawl and ratchet 43, 44 by a solenoid 45. The solenoid 45 is controlled by the dial contacts 21a and 22a associated with the timing dial 14. The drum cams 29 to 42, inclusive, control a plurality of drum contacts 46 to 59, respectively. The drum contacts 54 to 59 control the sequence of signal lamp energization. The drum contacts 51, 52 and 53 are provided as spares for any special use which may be desired, and the remaining drum contacts are connected as interlock contacts in the control system to be described more fully hereinafter.

As mentioned above, the solenoid 45 is controlled by the dial contacts 21a and 22a. These contacts are actuated by keys 21 and 22 in the outer row of slots in the dial 14. In the embodiment of the invention shown the drum controller 14a has six positions. Thus, in order that one complete revolution of the dial 14 shall produce one complete revolution or cycle of the drum 14a, there must be six keys in the outer row of slots. It may be that the signal sequence selected does not require six keys. In this case, some of the keys must be used as dummy keys in the sense that they advance the drum 14a even though the drum cams are so shaped as to effect no change in signal energization upon such dummy advance.

To maintain a synchronous relation between the program timing dial 14 and the drum 14a, one of the drum contacts is included in the normal energizing circuit of the drum advance solenoid 45. The drum contact 46 associated with the drum cam 29 is arranged to be closed in all except one position of the drum shaft 28 and is connected in series circuit relation with the normal energizing circuit for the solenoid 45. This normal energizing circuit may be followed from the high potential line L of a suitable source of alternating current supply through the normally open dial contacts 21a, the drum interlock contact 46, a manually operable selector switch 60 and an actuating winding 61 of the solenoid 45 to ground. The alternating current supply source is connected by conductors N and L to a terminal board T, the conductor N being grounded. Thus, in the one drum shaft position in which the interlock contact 46 is open the drum advance keys 21 on the timing dial 14 are unable to energize the solenoid 45. In this position of the drum shaft an alternative solenoid energizing circuit is completed through the dial contact 22a when the contact 22a is actuated by the dial key 22. This alternative circuit may be followed from the supply through a manually operable control switch 62, a pair of contacts 27a on the transfer switch 27, which are closed except in flashing amber operation of the controller, the dial contacts 22a, the manually operable selector switch 60 and the actuating winding 61 of the solenoid 45. The selector switch 60 is shown in position for automatic operation, but is shown provided also with an alternative position which disconnects solenoid 45 from the timing dial 14 and connects the solenoid for manual drum advancing operation by a push button 63.

For flashing amber operation the transfer switch 27 is provided with a pair of contacts 27b and 27c which, when engaged, connect the amber lamps of the signal device 10 in parallel circuit relation to the supply source N, L through the flasher contacts 26. In this alternative position of the transfer switch 27 the red and green lamp circuits are disconnected from the supply source at the contacts 27a of the switch.

In automatic operation the forward field winding 18 of the timing dial driving motor 15 is constantly energized through a manually operable control switch 64. In the absence of vehicle actuation the timing motor 15 is normally disabled by the brake coil 17, an energizing circuit for which is completed either by the dial contact 23a or by the dial contact 24a. Since the dial contacts 23a and 24a are controlled by the keys 23 and 24, respectively, on the program timing dial 14 itself, the brake coil 17 normally holds the dial 14 stationary at one or the other of two positions determined by the positions of the keys 23 and 24. These keys are located in the inner row of slots 20 of the dial 14 immediately before the end of the green or right-of-way periods on the main and cross streets M and C. The brake coil circuit is controlled also by the vehicle detectors 13a, 13b, 13c and 13d, by a pair of manually operable recall switches 65 and 66, and by a plurality of timing relay contacts included in the timing unit 12 (Fig. 1B).

The detectors 13a, 13b, 13c, and 13d are connected to the controller through the terminal board T, as indicated in Fig. 1A. These detectors may be of any well known type which operate to give an electric impulse upon the passage of a vehicle. At Fig. 1, the pairs of detectors 13a, 13b, 13c and 13d are shown connected to a pair of relays 67 and 68 through a pair of detector amplifiers 69 and $69^1$, respectively. The terminal board T also provides three terminals for alternative connection to a set of detectors 70 of a type not requiring amplification and relaying.

Figure 2:
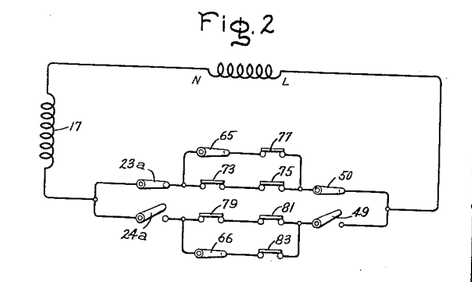
Figs. 2 to 8, inclusive, are simplified circuit diagrams of certain of the individual circuits shown at Figs. 1A and 1B.

The brake coil circuit for the program controller timing motor 15 is shown in simplified form at Fig. 2. The power for the brake coil circuit is taken from the alternating current supply terminals N and L. The coil shown between these terminals at Fig. 2 is the primary winding of an auto transformer 71, shown at Fig. 1B and connected to the power supply terminals N and L on the terminal board T through the plug connector 12a. At Fig. 2 the brake coil 17 is shown connected to the power supply terminals N and L through a number of relay and interlock contacts connected in various combinations of series and parallel circuit relation. Two alternative brake coil circuits are shown connected in parallel circuit relation through the dial contacts 23a and 24a, respectively. It will be understood that the contacts 23a and 24a are alternately closed, the contacts 23a being closed near the end of the M street green period and the contacts 24a being closed near the end of the C street green period, as indicated by the position of the keys 23 and 24 on the timing dial 14.

The dial contacts 23a are connected in the brake coil circuit in series circuit relation with a pair of normally closed contacts 73 of an interval extension relay 74 (Fig. 1A), a pair of normally closed contacts 75 of a maximum interval timing relay 76 (Fig. 1B), and the drum contacts 50 controlled by the drum shaft 28 of the drum controller 14a. The drum contacts 50 are arranged to be closed during the M street green period and open at all other times. The relay contacts 73 and 75 are arranged to be shunted by a circuit including in series the recall switch 65 and a pair of normally closed contacts 77 of a memory relay 78 (Fig. 1A).

Similarly an anternative brake coil circuit through the dial contacts 24a includes in series circuit relation a pair of normally closed contacts 79 of an interval extension relay 80 (Fig. 1A), a pair of normally closed contacts 81 of a maximum interval timing relay 82 (Fig. 1B), and the drum contacts 49 on the drum controller 14a. The drum contacts 49 are arranged to be closed during the C street green interval and open at all other times. Similarly, also, the relay contacts 79 and 81 are arranged to be shunted through a circuit including in series the recall switch 66 and a pair of normally closed contacts 83 of a memory relay 84 (Fig. 1A).

Figure 3:
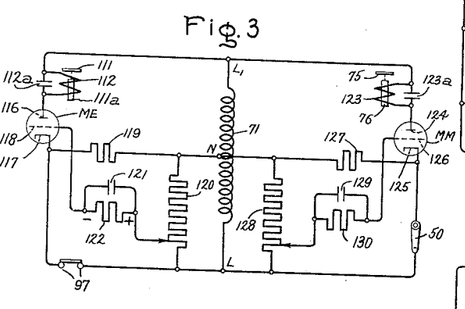
Figure 4:
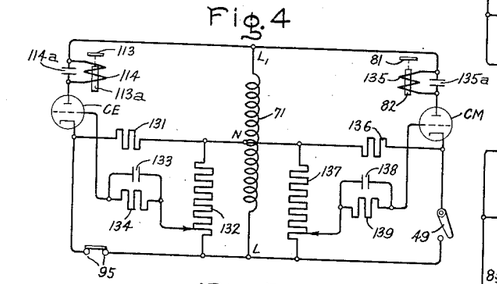

The brake coil circuit of Fig. 2 is controlled by the vehicle detectors 13 through the memory relays 78 and 84 and also through the various interval extension and maximum interval relays 74, 76, 80 and 82, the interval timing relays in turn being controlled by electronic timing circuits shown at Fig. 1B and in simplified form in Figs. 3 and 4.

Figure 5:
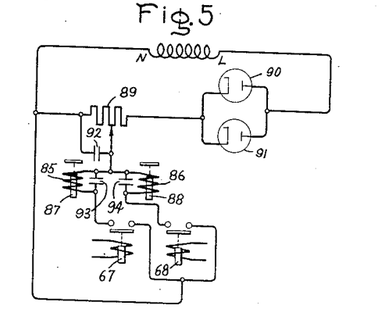

Referring first to the detector relay circuits shown in simplified form at Fig. 5, it will be observed that the normally open relays 67 and 68 (Fig. 1A) are arranged alternatively to energize the actuating windings 85 and 86 of a pair of detector relays 87 and 88, respectively. The detector relay windings 85 and 86 are supplied with uni-directional potential derived from across a portion of a load resistor 89 connected in a rectifier circuit between the alternating current supply terminals N and L. This circuit, as shown at Figs. 1B and 5, comprises a pair of diode rectifiers 90 and 91 connected in parallel circuit relation with each other and in series with the load resistor 89 across the alternating current terminals N and L. That portion of the load resistor 89 from which the detector relay potential is taken is shunted by a high frequency by-pass capacitor 92. The detector relay actuating windings 85 and 86 are shunted by capacitors 93 and 94, respectively, to provide for delayed drop-out of these relays.

Figure 8:
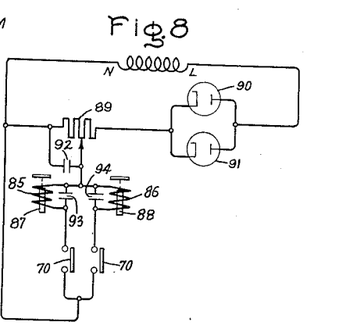

At Fig. 8 I have shown an alternative detector relay circuit wherein the actuating windings 85 and 86 of the detector relays are controlled directly by the street detectors 70 rather than by the detectors 13 through the amplifier relays 67 and 68. It will be understood that the circuit at Fig. 8 is only used where the street detectors 70 are of a design which is capable of directly closing control contacts in the detector relay circuit.

Each detector relay 87, 88 is provided with a pair of normally open and a pair of normally closed contacts. The C street relay 87 includes normally closed contacts 95 and normally open contacts 96, while the M street relay 88 includes normally closed contacts 97 and normally open contacts 98. The normally open detector relay contacts 96 and 98 control the memory relays 78 and 84, respectively, and the normally closed detector contacts control the electronic extension interval timing circuits which will be more fully described hereinafter.

Figure 6:
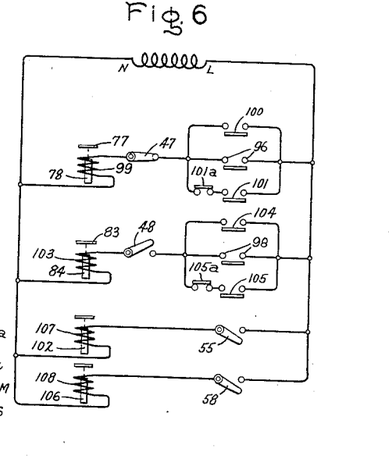

The memory relay circuits are shown in simplified form in Fig. 6. As shown at Fig. 6, the memory relay 78 is provided with an actuated winding 99 arranged to be connected across the alternating current supply conductors N—L through the drum contacts 47 in series circuit relation with the normally open detector relay contacts 96. The detector relay contacts 96 are arranged to be shunted by a normally open interlock contact 100 on the memory relay 78 or by a normally open contact 101 on a locking relay 102 in series circuit relation with a normally closed contact 101a on the extension relay 80 (Figs. 1A and 6). Similarly the memory relay 84 is provided with an actuating winding 103 arranged to be connected across the alternating current supply conductors N—L through the drum contacts 48 in series circuit relation with the normally open detector relay contacts 99. The detector relay contacts 98 are arranged to be shunted by a normally open contact 104 on the memory relay 84 or by a normally open contact 105 of a locking relay 106 in series circuit relation with a normally closed contact 105a on the extension relay 74. The drum contacts 47 are arranged to be closed at all times except during the C street green interval. The drum contacts 48 are arranged to be closed at all times except during the M street green interval.

From Fig. 6 it will also be evident that the actuating windings 107 and 108 of the locking relays 102 and 106 respectively, are arranged to be connected to the alternating current supply conductors N—L through the drum contacts 55 and 58, respectively. These drum contacts 55 and 58 are those controlling the amber lights on the signal device 10. The contacts 55 are arranged to be closed only during the amber period preceding C street green, and the drum contacts 58 are arranged to be closed only during the amber period immediately preceding M street green.

Figure 7:
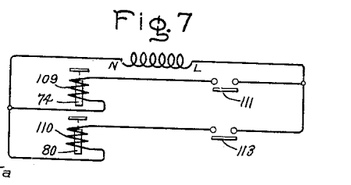

At Fig. 7 I have shown in simplified form the energizing circuits for the actuating windings 109 and 110 of the interval extension relays 74 and 80, respectively. The actuating winding 109 is arranged to be connected across the alternating current supply conductors N—L through a normally open contact 111 of an extension interval timing relay 111a which is itself provided with an actuating winding 112 (Fig. 1B). Similarly, the actuating winding 110 of the interval extension relay 80 is arranged to be connected across the alternating current supply source through a normally open contact 113 of an extension interval timing relay 113a which is itself provided with an actuating winding 114 (Fig. 1B). The relay windings 112 and 114 are shunted by capacitors 112a and 114a, respectively, for delayed drop-out operation.

The control circuits for the extension interval timing relays 111a and 113a and the maximum interval timing relays 76 and 82 are shown at Fig. 1B and in simplified form at Figs. 3 and 4. Fig. 3 shows the circuits controlling M street extension and maximum right-of-way intervals, and Fig. 4 shows the circuits controlling C street extension and maximum right-of-way intervals. The time delay circuits for C street and for M street are similar in all respects, so that only Fig. 3 need be described in detail.

Referring then to Fig. 3, the actuating winding 112 of the extension interval timing relay 111a is connected in the anode circuit of an electron discharge device ME having an anode 116, a cathode 117, and a control electrode 118. The electron discharge device ME is energized from the autotransformer 71. Specifically, the anode 116 is connected through the time delay relay winding 112 to the terminal $L_1$ of the autotransformer and the cathode 117 is connected through the normally closed M street detector relay contact 97 to the transformer terminal L. The cathode 117 is connected also to the grounded transformer terminal N through a resistor 119. Between the transformer terminals N and L there is connected a voltage divider 120, and from an intermediate point on the voltage divider connection is made to the control electrode 118 through a capacitor 121 and a discharge resistor 122. The voltage divider tap is preferably closer electrically to the transformer terminal L than to the terminal N.

The M street maximum interval timing relay 76 is provided with an actuating winding 123 connected in the anode circuit of a three element electron discharge device MM having an anode 124, a cathode 125, and a control electrode 126. The electron discharge device MM and the relay winding 123 are connected to the autotransformer 71 in a manner entirely similar to the connection of the electron discharge device ME and the relay winding 113, except that the connection between the cathode 125 of the discharge device MM and the transformer terminal L is through the drum contacts 50 which are closed only during the M street green interval. The cathode 125 is connected also to the transformer terminal N through a resistor 127, and the control electrode 126 is connected to an intermediate point of a voltage divider 128 through a capacitor 129 which is shunted by a discharge resistor 130. The voltage divider 128 is connected between the transformer terminals L and N.

From Fig. 4 it will be observed that the actuating winding 114 of the extension interval timing relay 113a is connected in the anode circuit of a three-element electron discharge device CE, and that the cathode of the discharge device CE is connected to the terminal L of the transformer 71 through the normally closed contacts 95 of the detector relay 87. The cathode of the discharge device CE is connected also to the transformer terminal N through a resistor 131, and the control electrode of the discharge device CE is connected to an intermediate point of a voltage divider 132 through a capacitor 133 shunted by a discharge resistor 134. Similarly, the C street maximum interval timing relay 82 is provided with an actuating winding 135 connected in the anode circuit of a three-element electron discharge device CM. The cathode of the discharge device CM is connected to the transformer terminal L through the drum contacts 49 which are closed only during the C street green interval, and is connected also to the transformer terminal N through a resistor 136. The control electrode of the discharge device CM is connected to an intermediate point on a voltage divider 137 through a capacitor 138 and a discharge resistor 139 in parallel therewith.

Referring now more particularly to Fig. 3, the operation of the extension and maximum interval timing circuits will be understood from the following brief description. In the extension timing circuit including the discharge device ME it will be observed that, in the absence of vehicle actuation, the detector relay contacts 97 are closed, so that the full autotransformer voltage is applied between the anode and cathode of the discharge device ME, while a small in phase positive bias is applied to the control electrode 118 from the voltage divider 120. The discharge device ME, therefore, is conductive on alternate half cycles, and the current through the discharge device maintains the timing relay 111a picked-up. During negative half cycles when the discharge device ME is not conductive the capacitor 112a discharges through the coil 112 and thus maintains the relay 111a picked-up. If now a vehicle crosses an M street detector 13a or 13b, the amplifier relay 68 (Fig. 1A) is momentarily picked-up and completes the direct current energizing circuit for the detector relay 88 (Fig. 1B). While actuation of the detector itself and the relay 68 is only momentarily, the detector relay 88 remains picked-up for a longer time by reason of the capacitor 94 shunted across the relay energizing winding 86. The capacitor 94, by discharging through the winding 86, delays drop-out of the detector relay 88. Thus upon each vehicle actuation the contacts 97 (Fig. 3) are opened for an appreciable interval.

When the contacts 97 are opened the plate voltage on the discharge device ME is reduced to one-half its former value because the cathode 117 is now connected to the transformer mid-point N through the resistor 119, rather than directly to the line terminal L as before. Moreover, with the contacts 97 open an in phase negative alternating potential is applied to the control electrode 18 through the voltage divider 120 and the resistor 122. The discharge device ME therefore becomes nonconductive immediately upon opening of the contacts 97, so that the timing relay 111a drops out.

While the contacts 97 remain open by reason of the delayed drop-out of the detector relay 88, the capacitor 121 in the control electrode circuit of the discharge device ME is charged on alternate half cycles through a rectifier circuit including the resistor 119 and the cathode and control electrode of the discharge device ME. The charging potential is that appearing between the intermediate tap on the voltage divider 120 and the transformer terminal N. By reason of this charging of the capacitor 121 the control electrode 118 is brought to a relatively high negative D. C. potential with respect to the opposite end of the resistor 122. When now the contacts 97 are reclosed upon delayed drop-out of the detector relay 88, conduction through the discharge device ME is delayed by the negative potential thus built up on the control electrode 118. Upon reclosure of the contacts 97, however, the small alternating potential supplied between the control electrode and cathode from the lower end of the voltage divider 120 is insufficient to maintain the large negative charge upon the control electrode, so that the capacitor 121 discharges through the resistor 122. When the charge on the capacitor 121 has leaked off sufficiently to permit the discharge device ME to conduct, the timing relay 111a is again energized by anode current through the discharge device.

Operation of the maximum timing circuit shown at Fig. 3 and including the discharge device MM is entirely similar to the circuit of the discharge device ME, except that the timing is controlled by the drum contacts 50 rather than by a detector relay contact. It will be recalled that the drum contacts 50 are closed only during the M street green interval. When the contacts 50 are open the discharge device MM is not conductive and the maximum timing relay 76 is dropped out. As soon as the M street green interval begins the contact 50 is closed to initiate time delay pick-up of the timing relay 76 as determined by discharge of the capacitor 129. Preferably, of course, the maximum timing circuit provides a longer delay than the extension timing so that the resistor 130 is preferably several times as large as the resistor 122.

The timing circuits shown at Fig. 4 for the cross street C are entirely similar to those shown at Fig. 3 for the main street M, and their operation will be fully understood from the foregoing description. It should be noted at Fig. 4 that the circuit of the discharge device CE times extension intervals for the cross street, while the circuit of the discharge device CM times the maximum intervals for the cross street.

With the foregoing description of the various parts of my improved traffic control system and the apparatus included therein, the operation of the system as a whole may now be understood. As previously pointed out, the apparatus may be set to operate in any of a plurality of ways. The various modes of operation of the system as determined by the various settings of the apparatus may best be understood by separate consideration.

*Full actuation—Right-of-way remaining on street last called*

For operation of the system as a fully actuated system, that is, one in which detectors are provided in both the main and the cross streets with provision for maintenance of right-of-way upon the street last called, both the manually operable recall switches 65 and 66 are closed. Assuming that the conductors N and L on the terminal board T are connected to a suitable source of alternating current supply and that the transformer switch 27 is in the position at Fig. 1A, power is applied to the signal lamp circuits and to the autotransformer 71. It will also be assumed that the apparatus is set for automatic operation by closure of the manual switches 62 and 64 and closure of the selector switch 60 in the position shown at Fig. 1A. Thus the forward motor field winding 18 of the timing motor 15 is energized.

Let it further be assumed that no vehicle actuation has occurred during a period in excess of any timing interval provided for in the apparatus and that the last vehicle actuation occurred on M street. Under these circumstances the dial key 23 will be in position under the dial contacts 23a, as shown at Fig. 1, thereby to close these contacts and to complete a braking circuit for the motor 15 through the braking coil 17. The timing dial 14 thus remains at rest in this position. Referring now to Fig. 2, the assumed braking circuit may be followed from the transformer terminal N through the brake coil 17, the dial contacts 23a, the recall switch 65, the normally closed memory relay contacts 77, and the drum contacts 50 to the transformer terminal L.

Under the conditions assumed, that is, with the timing dial 14 held stationary near the end of the main street green interval by the dial key 23, it will be observed from Figs. 3 and 4 that both the main and cross street extension timing relays 111a and 113a are picked-up because the detector relay contacts 97 and 95, respectively, are closed. Also, the main street maximum timing relay 76 is picked-up because the drum contacts 50 are closed. However, the cross street maximum timing relay 82 is dropped out because the drum contacts 49 are open. Thus in the brake coil circuit of Fig. 2 the maximum time relay contacts 75 are open, while the main street extension relay contacts 73 are also open by reason of the energization of the extension interval relay 74 through the extension interval timing relay 111a.

Let it now be assumed that a vehicle actuates one of the C street detectors 13a or 13b. An impulse from either of these detectors is amplified in the amplifier 69 and used to energize the relay 67 (Figs. 1A and 5). The relay 67 then picks-up and completes an energizing circuit for the detector relay 87. When the detector relay 87 picks-up it completes, through its normally open contacts 96, an energizing circuit for the memory relay 78. This energizing circuit is completed through the drum contacts 47 which are closed in the main street green position of the cam drum 14a. When the memory relay 78 picks-up it locks itself in through its normally open interlock contacts 109 and opens its normally closed contacts 77. When the contacts 77 are opened (Fig. 2) the brake coil circuit is interrupted because, as previously pointed out, the timing relay contacts 73 and 75 are also open. Thus the timing dial 14 is set in operation to initiate an alternation of the signal indication. As soon as the dial moves the key 23 away from the dial contacts 23a, both dial contacts 23a and 24a are open, so that the brake coil 17 cannot again be energized at least for a half revolution of the dial when the dial key 24 closes the dial contacts 24a. As the timing dial 14 rotates, the dial contacts 21a are recurrently closed by the dial keys 21, thereby to effect an intermittent rotation of the drum shaft 28 and to change the signal indication from green on the M street to green on C street. As soon as the drum 14a arrives at the C street green position the drum contacts 47 are opened and the memory relay 78 thus deenergized.

If no further vehicle actuation occurs, the timing dial will again come to rest as soon as the dial key 24 closes the dial contacts 24a, thereby to complete a braking circuit (Fig. 2) through the dial contacts 24a, the recall switch 66, the normally closed main street detector relay contacts 83, and the drum contacts 49, the contacts 49 being closed throughout the C street green interval. Since the dial key 24 is located shortly before the termination of the C street green interval, the timing dial 14 will come to rest with the right-of-way remaining on C street.

During the foregoing operation various timing circuits were set in operation in a manner which may now be noted. In the first place, as soon as the C street detector was actuated and the detector relay 87 picked-up, the C street extension interval timing circuit including the discharge device CE (Fig. 4) was set in operation. When the detector relay contacts 95 were opened, the discharge device CE was cut off and the relays 113a and 80 dropped out. Upon reclosure of the contacts 95 by delayed drop-out of the detector relay 87, the resistor 134 and the capacitor 133 timed a single extension interval before reenergization of the timing relay 113a. This extension interval, however, is considerably shorter than the C street green interval determined by the timing dial 14, so that before the dial 14 again comes to rest the timing relay 113a is again energized and picks-up its interval extension relay 80.

Similarly, as soon as the C street green interval was initiated the drum contacts 49 were closed thereby to initiate timing of a maximum right-of-way interval for C street. This maximum interval normally is greater than the C street green interval determined by the timing dial 14, so that the maximum interval timing relay 82 will pick-up after the timing dial comes to rest near the end of C street green. Pick-up of the timing relay 82, however, has no immediate effect in the absence of further vehicle actuation, since it simply opens its contacts 81 in the brake coil circuit (Fig. 2) without interrupting the new brake coil circuit through the contacts 66 and 83.

Let it be assumed for the purpose of illustration that the C street green interval determined by the dial 14 is 20 seconds, the C street maximum right-of-way interval determined by the timing relay 82 is 40 seconds, and the C street extension interval determined by the relay 113a is 5 seconds.

It will now be observed that if, after the C street vehicle actuation described above, a second vehicle actuation occurs on C street, the detector relay 87 will again be picked up to initiate at its contacts 95 a second timing interval for the extension timing relay 113a. Drop-out of the timing relay 113a for one complete extension interval, assumed as 5 seconds, deenergizes the interval extension relay 80 for the same length of time. Thus each vehicle actuation on C street during the C street green interval causes drop-out of the extension relay 80 and closure of the relay contacts 79 in the brake coil circuit for one complete extension interval following such actuation.

If the foregoing second vehicle actuation on C street, i. e., during the C street green interval, occurred more than one complete extension interval (i. e., 5 seconds) prior to closure of the dial contacts 24a, the extension timing has no effect, for the relay contacts 79 are restored to open position before the contacts 24a are closed. If, however, timing of an extension interval is begun less than one such interval before closure of the dial contacts 24a, closure of the dial contacts completes a braking circuit through the relay contacts 79 and 81, independently of the contacts 66 and 83 (Fig. 2). This is true because the C street maximum timing relay 82 has not yet picked-up, so that its contacts 81 are still closed. It may now be understood that the dial 14 is thus held at rest on the key 24 by the extension relay 80 until at least 5 seconds after the extending actuation, even though a vehicle actuation on M street causes opening of the memory relay contacts 83.

Similarly, if an additional vehicle actuation occurs on C street prior to the expiration of the first extension and also prior to the expiration of the maximum interval, the brake coil circuit is maintained for an additional extension interval (i. e., 5 seconds) from the time of the second extending actuation. This action may take place repeatedly, either until the expiration of the last extension called for or until the expiration of the maximum timing interval. In the event the last extension expires without an additional call, the contacts 79 in the brake coil circuit are opened by the extension timing relay 113a and the interval extension relay 80.

When the maximum time interval expires the contacts 81 in the brake coil circuit are opened by the maximum timing relay 82 so that further extensions cannot maintain the brake circuit through the contacts 79. If at the expiration of such maximum time or the expiration of the last C street extension called, no vehicle actuation has occurred on M street, the brake coil circuit remains completed through the recall switch 66 and the memory relay contacts 83, so that the timing dial 14 remains at rest on the key 24 to maintain the right-of-way indication on C street. If, however, prior to expiration of either of the above timing intervals a vehicle actuation has occurred on M street, the memory relay 84 will have been picked up by the detector relay 88 and locked in by its own contacts 104. Thus, upon expiration of either or both of the timing intervals mentioned above the brake coil circuit will again be interrupted and the timing dial 14 set in motion to change the right-of-way indication to M street. This action will take place in substantially the same manner as described hereinbefore in connection with transfer of the right-of-way indication to C street.

*Fully actuated—With automatic return to main street green*

In order to set the apparatus for automatic return to M street green, following C street right-of-way and without a vehicle actuation on M street, the recall switch 66 is opened, the recall switch 65 being left closed. If now it is assumed, as above, that initially the timing dial 14 is at rest on the dial key 23 near the end of M street green interval, a vehicle actuation on C street will effect a transfer of the right-of-way in the same manner as described above, i. e., by opening the memory relay contacts 77 in the brake coil circuit and releasing the timing dial 14 for rotation.

If now no further vehicle actuation occurs on either street, the brake coil circuit is not reclosed near the end of C street green interval by the dial key 24, because the recall switch 66 and the extension relay contacts 79 are both open. The extension relay contacts 79 open in the absence of a second C street actuation, as described in the previous section. Therefore, the timing dial 14 continues in operation until the dial key 23 in the M street green interval again closes the dial contacts 23a to complete a brake coil circuit through the recall switch 65.

If, of course, within the predetermined extension interval (i. e., 5 seconds) prior to the closing of the dial contacts 24a near the end of the C street green interval, a second vehicle actuation is registered on C street, the extension relay contacts 79 in the brake coil circuit of Fig. 2 are held closed for one full extension interval, so that the dial key 24, by closure of the dial contacts 24a, does complete a brake coil circuit during the C street green interval. This circuit is through the extension relay contacts 79 and the maximum timing relay contacts 81. Similarly, additional extensions, if registered prior to the expiration of the previous extension, will be effective in maintaining this brake coil circuit until such time as the C street maximum timing relay 82 opens its contact 81 in the brake coil circuit. Either at this time or simply upon expiration of the last extension call the timing dial 14 will again be set in operation without any vehicle actuation on M street by reason of the fact that either the contacts 79 or the contacts 81 and the recall switch 66 in the brake coil circuit are open. Thus the recall switch 66, being in series with the memory relay contacts 83, function to simulate a permanent call on M street.

It should also be noted that, with the apparatus set for normal return to M street green as described above, extension on the M street green interval may be obtained within the M street maximum interval. That is, if with the timing dial 14 at rest on the key 23 near the end of the M street green dial interval, a vehicle actuation is registered on M street and the M street maximum right-of-way interval has not expired, the M street maximum timing contacts 75 (Fig. 2) will still be closed and the M street extension contacts 73 will be closed for an extension interval in response to the vehicle actuation. Thus, the braking circuit through the M street dial contacts 23a is positively maintained for the extension interval even though a vehicle actuation on C street effects an opening of the memory relay contacts 77. Such M street extensions may continue to be registered until the termination of the M street maximum right-of-way interval.

*Fully actuated—With automatic return to cross street right-of-way*

The apparatus may be set for full actuation with automatic return to C street green by closing the recall switch 66 and leaving the recall switch 65 open. The operation under this condition of the apparatus is entirely similar in all respects to that described above in connection with automatic return to M street green.

*Pretimed operation with vehicle extensions on both streets*

My apparatus is also operable as a normally pretimed apparatus providing for time extension in response to vehicle actuation on both streets. For such operation both the recall switches 65 and 66 are left open. Under these circumstances, and in the absence of any vehicle actuation, the extension relay contacts 73 and 79 in the brake coil circuit are both open at all times because the extension interval timing relays 111a and 113a are maintained picked-up and thus retain the interval extension relays 74 and 80 picked-up. Therefore, with the recall switches 65 and 66 open, no brake coil circuit is ever completed upon closure of the dial contacts 23a or 24a. Thus the motor 15 continues in operation and the timing dial 14 rotates continuously.

It will be noted, however, that at the beginning of each right-of-way interval, either on M or C street, timing of a maximum right-of-way interval for the street getting the green signal is initiated by closure of either the drum contacts 49 or the drum contacts 50. Thus, if it is assumed that in continuous operation the timing dial 14 has just initiated a C street green interval, the drum contacts 49 will be closed, thereby to initiate a timing interval for the maximum timing relay 82. The relay 82 will thus remain dropped out for the maximum time interval and will hold its contacts 81 in the brake coil circuit closed. If now within one extension interval (i. e., 5 seconds) prior to closure of the dial contacts 24a near the end of the C street green interval, a vehicle actuation is registered on C street, the detector relay contacts 95 will be opened and reclosed to initiate a timing interval for the extension interval timing relay 113a. The relay 113a will thus remain dropped out and will maintain the interval extension relay 80 dropped out for the full extension interval. When, during this interval, the dial contacts 24a are closed by the key 24 near the end of the C street green dial interval, a brake coil circuit is completed, so that the timing dial 14 is held stationary on the dial key 24. If only one extension is registered, the dial 14 will again be set in operation at the end of the extension interval when the extension relay contacts 79 open. If, however, further extensions are registered prior to expiration of the preceeding extension and also prior to expiration of the maximum right-of-way interval timed by the relay 82, the timing dial will be further held up, either until the expiration of the last extension called or until the expiration of the maximum interval, as described hereinbefore.

Similar time extensions may be registered on M street during the M street green interval by operation of the dial contacts 23a in conjunction with the extension relay contacts 73 and the maximum timing relay contacts 75.

*Locking relay circuits*

Let it be supposed that the timing dial 14 has just moved off one of the brake coil keys 23 or 24, either because the maximum right-of-way interval for the associated street has expired or because the last called extension has expired with a call or simulated call registered on the other street. Specifically let it be assumed that the timing dial has just moved off of the brake coil key 23 at the end of M street green on the timing dial. If now, between the opening of the dial contacts 23a and the end of the M street green interval as determined by the nearest dial key 24, a vehicle actuation is registered on M street, an extension will not be obtained by the actuating vehicle because of the prior opening of the dial contacts 23a, and the vehicle will not have time to cross the intersection. Moreover, during this short interval the drum contacts 48 are open so that the detector relay 88 will not pick-up the memory relay 84.

However, the detector relay 88, in response to the vehicle actuation, has dropped out the extension timing relay 111a, so that the interval extension relay 74 will remain dropped out for one extension interval. The extension relay 74 will therefore close its contacts 105a in the memory relay circuit (Fig. 6). Also, during the amber interval following the termination of the M street green interval the drum contacts 58 are closed, thereby to complete an energized circuit for the locking relay 106. When the locking relay 100 picks-up it closes its normally open contacts 105, thereby to complete an energizing circuit for the actuating winding 103 of the memory relay 84. This energizing circuit includes the drum contacts 48 which are open only during the M street green interval and are thus closed during the amber interval following M street green. The memory relay 84, when energized locks itself in through its interlock contacts 104, and thereby remembers the call from the late arriving vehicle on M street. Thus the memory relay 84 retains its contacts 83 and the brake coil circuit open until the expiration of all extensions called on C street, whereupon the brake coil circuit is interrupted and the timing dial 14 resumes its operation to retransfer the right-of-way back to M street in response to the call of the late arriving vehicle.

An entirely similar locking operation takes place in conjunction with the locking relay 102 upon actuation of the cross street detector under circumstances similar to those described immediately above for the main street.

From the foregoing it will be understood that if a vehicle on either street actuates a detector during the amber interval following a right-of-way interval the memory relay for that street picks-up directly through the detector relay contacts 96 or 98, since the appropriate drum contacts 47 or 48 are then closed. The memory relays remember such calls in the same manner as described above, but without the use or need of the locking relays.

Partial actuation

My new and novel controller is also capable of operation as a partial, or semi-actuated, controller, i. e., a vehicle actuated controller in which vehicle detectors are supplied only on one of the intersecting streets. If, for example, it is assumed that only cross street actuation is desired, the discharge devices ME and MM providing for main street extension and maximum timing are omitted, along with the omission of the timing relays 111a and 76, the interval extension relay 74, the locking relay 106 and the memory relay 84. Thus, referring to Fig. 2, the brake coil circuit is normally closed, in the absence of any vehicle actuation, through the cross street memory relay contacts 77. Cross street actuation therefore will set the dial 14 into operation. There being no main street detector, and the main street extension and maximum contacts 73 and 75 being omitted, there can, of course, be no main street extension registered. However, when the dial contacts 24a are closed near the end of the cross street green interval, cross street extensions may be obtained through the cross street extensions and maximum contacts 79 and 81. The dial 14 cannot of course be held up on the dial key 24 beyond the cross street maximum interval, for the memory relay contact 83 is omitted and the circuit permanently open at this point.

Operation at intersections of more than two traffic lanes

Assume a three-way intersection composed of streets A, B and C, with a controller built according to the invention and arranged for automatic recall to A street. The rotating timer will thus normally be held stationary on a brake coil key positioned near the end of A street green. I have described above a main street system in which an actuation on a cross street will release the timer for a single revolution. It is now assumed that there are two such cross streets, each having a detector, so that actuation of either detector will release the timer for a single revolution. Such a modification requires only a duplication of parts, and is not significantly different from the single cross street embodiment illustrated, which is provided with two detectors, one for each direction of movement, and either of which will release the timer for one complete revolution.

Assuming then a three street intersection with the timer normally stationary on A street green and detectors in each of the three streets, it is evident that an actuation of either the B street detector or the C street detector will initiate one revolution of the timing dial. Operation under these circumstances is clear from the foregoing description of main street recall operation.

Suppose, for example, that the B street detector is first actuated and then the C street detector is actuated shortly thereafter. Actuation of the B street detector will start a single timing cycle by releasing the timer. Such a cycle will include a period at C street green, which gives the right-of-way in due course to the car on C street. If the actuation on C street came so soon after the B street actuation that B street green had not yet arrived, the C street actuation is simply superfluous. If the C street actuation came during the C street green interval, and sufficiently near the end of the C street green interval, the timer would be stopped momentarily on the C street green position to grant an extension for the C street car. Such an extension of the green interval during a rotation of the timer is described above. Finally, if the actuation on C street came after the C street green interval, or so late in the C street green interval that it was ineffective to obtain an extension of C street green, then the memory relay will remain actuated and initiate another cycle of operation after the first cycle is completed.

Carrying the assumed example still further, if the reverse condition is still true, so that a first actuation comes on C street and shortly thereafter an actuation occurs on B street, the first actuation (C street) will initiate one revolution of the timing dial. During this cycle of operation, B street will get the green light before C street, so that any car arriving on B street very shortly after that on C street will get the right of way. If the B street car arrived during the B street green interval, it would simply register a B street green extension automatically, as described above. If on the other hand the car on the B street arrived after the B street green interval, or so near the end of the B street green interval that it was unable to obtain an extension, the memory relay would remember the actuation and initiate another cycle of operation in the manner heretofore described.

Thus, by a mere duplication of parts, it is clearly possible to extend the application of my invention to a three street, four street or five street intersection, or to any desired number of intersecting traffic lanes. This follows readily from the fact that, while I have illustrated only a single pair of intersecting lanes, each lane is provided with two detectors connected in parallel circuit relation (Figure 8). Since my detector relays, locking relays, and memory relays are also connected in parallel circuit relation, and the braking coil circuits for the separate streets are likewise connected in parallel circuit relation, the manner of extending my arrangement to take care of more than a single pair of intersecting traffic lanes is obvious. A simple paralleling of additional contacts, relays, etc., is all that is required.

It will now be evident from the foregoing description that my new and novel vehicle actuated traffic signal control system and apparatus is extremely flexible in providing simple adjustment for operation in any one of a number of ways. It has a further advantage in providing a maximum of continuity of service, for the timing unit 12 shown at Fig. 1B may easily be detached from the apparatus at the plug connector 12a and the apparatus readily set for temporary pretimed operation simply by opening both recall switches 65 and 66. In such temporary operation with the timing unit 12 disconnected, of course, simple pretimed operation is obtained. No right-of-way extensions are possible in response to vehicle actuation because the timing relays 76, 82, 111a and 113a are removed from the circuit.

While I have described by way of illustration only a preferred embodiment of my invention, many modifications will occur to those skilled in the art, and I therefore wish to have it understood that I intend in the appended claims to cover all such modifications as fall within the true spirit and scope of my invention.

What I claim as new and desire to secure by Letters Patent in the United States is:

1. A vehicle actuated traffic signal control system comprising a signal device providing stop and go indications for each of a plurality of intersecting traffic lanes, a rotatable signal program controller having an electric driving motor, electric braking means for said motor, means for energizing said braking means in at least one of a plurality of predetermined controller positions corresponding to alternate conditions of signal indication, and means actuated by a vehicle approaching said device for disabling said braking means thereby to release said controller for operation to alternate said signal indication.

2. A vehicle actuated traffic signal control system comprising a signal device providing stop and go indications for each of a plurality of intersecting traffic lanes, a rotatable signal program controller having an electric driving motor, electric braking means for said motor, means for energizing said braking means in any of a plurality of predetermined controller positions corresponding to alternate conditions of signal indication, and means actuated by a vehicle approaching said device on a lane having a stop indication for disabling said braking means, thereby to release said controller for operation to a subsequent controller position in which a go indication appears on said lane.

3. A vehicle actuated traffic signal control system comprising a signal device providing stop and go indications for each of a plurality of intersecting traffic lanes, a rotatable signal program controller having an electric driving motor, electric braking means for said motor arranged when energized to hold said motor at rest, means for energizing said braking means only in any of a plurality of predetermined controller positions corresponding to predetermined conditions of signal indication, means actuated by a vehicle approaching said device on a street having a stop indication for disabling said braking means thereby to release said controller for operation, said controller when released preventing reenergization of said braking means at least until said signal device indicates "go" to said vehicle.

4. A vehicle actuated traffic signal control system for a pair of intersecting traffic lanes comprising a signal device providing stop and go indications for each of said lanes, a rotatable signal program controller including an electric driving motor having a braking coil, means responsive to controller position for normally energizing said braking coil in a controller position wherein said signal device displays a stop indication to a minor lane and a go indication to a major lane, means including a detector actuable by a vehicle approaching said device on said minor lane for disabling said braking coil thereby to release said controller for a complete cycle of operation to alternate said signal indications.

5. A vehicle actuated traffic signal control system comprising a signal device providing stop and go indications for each of a plurality of intersecting traffic lanes, a rotatable signal program controller including an electric driving motor having opposed running and braking windings, said braking winding when energized holding said motor in a position of rest, means including a contact actuated by said controller for energizing said braking winding in either of two controller positions corresponding to alternate conditions of signal indication, and means responsive to approach of a vehicle on a lane having a stop indication for deenergizing said braking winding, thereby to release said controller for operation to change said signal indication.

6. A vehicle actuated traffic signal control system comprising a signal device providing stop and go indications for each of a plurality of intersecting traffic lanes, a rotatable signal program controller including an electric driving motor having opposed running and braking windings, said braking winding when energized holding said motor in a position of rest, means including a contact actuated by said controller for energizing said braking winding in either of two controller positions corresponding to alternate conditions of signal indication, means responsive to approach of a vehicle on a lane having a stop indication for deenergizing said braking winding thereby to release said controller for operation to change said signal indication, and means responsive to approach of a vehicle on a lane having a go indication for preventing for a predetermined interval said deenergization of said braking winding by a vehicle approaching a stop indication.

7. A vehicle actuated traffic signal control system comprising a signal device providing stop and go indications for each of a plurality of intersecting traffic lanes, a rotatable signal program controller having an electric driving motor, electric braking means for said motor, means for energizing said braking means in any of a plurality of predetermined controller positions corresponding to alternate conditions of signal indication, means actuated by a vehicle approaching said device on a lane having a stop indication for disabling said braking means thereby to release said controller for operation to alternate the signal indication, and means actuated by a vehicle approaching said device on a lane having a go indication for preventing for a predetermined interval disabling of said braking means.

8. A vehicle actuated traffic signal control system comprising a signal device providing stop and go indications for each of a plurality of intersecting traffic lanes, a rotatable signal program controller having an electric driving motor, electric braking means for said motor, means for energizing said braking means in a controller position corresponding to a predetermined condition of signal indication wherein a go signal is displayed to one of said lanes and a stop signal is displayed to another of said lanes, means actuated by a vehicle approaching said device on a lane having a stop indication for disabling said braking means thereby to release said controller for operation to alternate the signal indication, and means actuated by a vehicle approaching said device on a lane having a go indication for rendering said disabling means ineffective for a predetermined interval thereafter.

9. A vehicle actuated traffic signal control system comprising a signal device providing stop and go indications for each of a plurality of intersecting traffic lanes, a rotatable signal program controller having an electric driving motor, electric braking means for said motor, means for energizing said braking means in at least one of a plurality of predetermined controller positions corresponding to alternate conditions of signal indication, means actuated by a vehicle approaching said device on a lane having a stop indication for disabling said braking means thereby to release said controller for operation to alternate said signal indication, means actuated by vehicles approaching said device on a lane having a go indication for rendering said disabling means ineffective for a predetermined interval following the last of such actuations thereby to extend said go indication, and time element means for limiting said extension to a predetermined maximum permissible duration.

10. A vehicle actuated traffic signal control system comprising a signal device providing stop and go indications for each of a plurality of intersecting traffic lanes, a rotatable signal program controller having an electric driving motor, electric braking means for said motor, means for energizing said braking means in at least one of a plurality of predetermined controller positions corresponding to alternate conditions of signal indication, means actuated by a vehicle approaching said device on a lane having a stop indication for disabling said braking means thereby to release said controller for operation to alternate the signal indication, means actuated by each vehicle approaching said device on a lane having a go indication for rendering said disabling means ineffective for a predetermined interval following each said actuation thereby to extend said go indication, and time element means actuated by said controller for limiting the maximum permissible duration of said extension.

11. A vehicle actuated traffic signal control system comprising a signal device providing stop and go indications for a plurality of intersecting traffic lanes, a rotatable signal program controller including an electric driving motor having opposed running and braking windings, said braking winding when energized holding said motor in a position of rest, means including a contact actuated by said controller for establishing an energizing circuit for said braking winding in at least one of a plurality of controller positions corresponding to alternate conditions of signal indication, means actuated by a vehicle approaching said device on a lane having a stop indication for interrupting said braking circuit thereby to release said controller for operation to alternate the signal indication, means actuated by each vehicle approaching said device on a lane having a go indication for rendering said interrupting means ineffective for a predetermined interval following each of such actuation thereby to extend said go indication, and time element means actuated by said controller for restoring the effectiveness of said interrupting means after an interval greater than said predetermined interval.

12. A vehicle actuated traffic signal control system comprising a signal device providing stop and go indications for each of a plurality of intersecting traffic lanes, a rotatable signal program controller having an electric driving motor, electric braking means for said motor, means responsive to controller position for normally energizing said braking means in a controller position wherein said signal device displays a stop indication to a minor lane and a go indication to a major lane, means including a detector actuable by a vehicle approaching said device on said minor lane for disabling said braking means thereby to release said controller to alternate said signal indication, means responsive to actuation of said detector by vehicles approaching said device on said minor lane against a go indication for energizing said braking means thereby to extend said go indication, and time element means actuated by said controller upon initiation of a go indication on said minor lane for independently disabling said braking means after a predetermined maximum extension interval.

13. A vehicle actuated traffic signal control system comprising a signal device providing stop and go indications for a pair of intersecting traffic lanes, a rotatable program controller having an electric driving motor, electric braking means for said motor, means responsive to controller position for normally energizing said braking means at a controller position wherein said signal device displays a stop indication to a minor lane and a go indication to a major lane, means including a detector actuable by a vehicle approaching said device on said minor lane for disabling said braking means thereby to release said controller for operation to alternate said signal indication, means including a second detector actuable by a vehicle approaching said device on said major lane with said controller in said normal position for rendering said disabling means ineffective for a predetermined interval following such major lane actuation, and time element means actuated by said controller upon initiation of a major lane go indication for rendering said second detector means ineffective after a maximum interval greater than said predetermined interval.

14. A vehicle actuated traffic signal control system for a pair of intersecting traffic lanes comprising a signal device providing stop and go indications for each of said lanes, a rotatable signal program controller having an electric driving motor, means responsive to controller position for normally disabling said motor in a controller position wherein said signal device displays a stop indication to a minor lane and a go indication to a major lane, means including a detector actuable by a vehicle approaching said device on said minor lane for rendering said disabling means ineffective thereby to initiate a complete cycle of controller operation, and means responsive to actuation of said detector while the go indication is displayed to said minor lane for delaying said controller for at least a predetermined interval at a position to continue the go indication on said minor lane.

15. A vehicle actuated traffic signal control system for a pair of intersecting traffic lanes comprising a signal device providing stop and go indications for each of said lanes, a rotatable signal program controller having an electric driving motor, means responsive to controller position for normally disabling said motor in a controller position wherein said signal device displays a stop indication to a minor lane and a go indication to a major lane, means including a detector actuable by a vehicle approaching said device on said minor lane for rendering said disabling means ineffective thereby to initiate a complete cycle of controller operation, and means responsive to subsequent vehicle actuation of said detector while the go indication is displayed to said minor lane for disabling said motor for at least a predetermined interval in a controller position to extend said minor lane go indication for said predetermined interval.

16. A vehicle actuated traffic signal control system for a pair of intersecting traffic lanes of relatively minor and major dignity comprising a signal device providing stop and go indications for each of said lanes, a rotatable signal program controller having an electric driving motor, means responsive to controller position for normally disabling said motor in a controller position wherein said signal device displays a stop indication to said minor lane and a go indication to said major lane, means including a detector actuable by a vehicle approaching said device on said minor lane for rendering said disabling means ineffective thereby to initiate operation of said controller to transfer the go indication to said minor lane, and means including a detector actuable by a vehicle approaching said device on said major lane while said controller is at rest in said normal position for maintaining said motor disabled for at least a predetermined interval thereafter independently of detector actuations on said minor lane.

17. A vehicle actuated traffic signal control system comprising a signal device providing with stop and go indications for each of a plurality of intersecting traffic lanes, a rotatable signal program controller having an electric driving motor, electric braking means for said motor, means responsive to controller position for completing an energizing circuit for said braking means in any of a plurality of predetermined controller positions corresponding to alternate conditions of signal indication, means actuated by a vehicle approaching said device on a lane having a stop indication for interrupting said energizing circuit thereby to release said controller for operation to the next consecutive position to alternate said signal indication, and means actuated by vehicles approaching said device on a lane having a go indication for rendering said interrupting means ineffective for a predetermined interval following each such actuation thereby to extend said go indication.

18. A vehicle actuated traffic signal control system comprising a signal device providing stop and go indications for each of a plurality of intersecting traffic lanes, a rotatable signal program controller having an electric driving motor, electric braking means for said motor, means responsive to controller position for completing an energizing circuit for said braking means in any of a plurality of predetermined controller positions corresponding to alternate conditions of signal indication, means actuated by a vehicle approaching said device on a lane having a stop indication for interrupting said energizing circuit thereby to release said controller for operation to the next consecutive predetermined position to alternate said signal indication, time element means actuated by vehicles approaching said device on a lane having a go indication for rendering said interrupting means ineffective for a predetermined interval following each such actuation, said time element means being effective to extend said go indication only if actuated when said controller is at rest or within said predetermined interval before said controller comes to rest.

19. A vehicle actuated traffic signal control system comprising a signal device providing a stop and go indication for each of a plurality of intersecting traffic lanes, a rotatable signal program controller having an electric driving motor, electric braking means for said motor, means responsive to controller position for completing an energizing circuit for said braking means in any of a plurality of predetermined controller positions corresponding to alternate conditions of signal indication, detector means actuated by a vehicle approaching said device on a lane having a stop indication for interrupting said energizing circuit thereby to release said controller for operation to the next consecutive rest position to alternate said signal indication, second detector means actuated by vehicles approaching said device on a lane having a go indication for rendering said disabling means ineffective for a predetermined interval following each actuation of said second detector means thereby to extend said go indication, and time element means actuated by said controller upon initiation of a go indication on any lane for restoring the effectiveness of said interrupting means after a predetermined maximum permissible right of way interval.

20. A traffic control system comprising a signal device providing stop and go indications for each of a plurality of intersecting traffic lanes, a rotatable signal program controller having an electric driving motor, means normally connecting said motor for continuous rotation thereby continuously to alternate said signal indications, electric braking means for said motor, and time element means responsive to approach of a vehicle on a lane having a go indication for energizing said braking means for a predetermined interval thereby to extend said go indication.

21. A traffic signal control system comprising a signal device providing stop and go indications for each of a plurality of intersecting traffic lanes, a rotatable signal program controller having an electric driving motor, means normally energizing said motor for continuous rotation thereby continuously to alternate said signals in a pretimed interval sequence, and time element means responsive to approach of a vehicle on a lane having a go indication and within a predetermined interval before the normal expiration of said go indication for energizing said braking means for said predetermined interval thereby to extend said go indication.

22. A traffic signal control system comprising a signal device providing stop and go indications for a plurality of intersecting traffic lanes, a rotatable signal program controller having an electric driving motor, means normally energizing said electric driving motor for continuous rotation thereby continuously to alternate said signals in a pretimed interval sequence, electric braking means for holding said controller at rest, time element means operable within a predetermined interval prior to the normal expiration of a go interval and in response to the approach of a vehicle on a lane having a go indication for energizing said braking means for said predetermined interval following the approach of such vehicle thereby to extend said go interval, and means including said time element means operable in response to the approach of successive vehicles on said lane and within said predetermined interval or while said controller is at rest for maintaining the energization of said braking means for said predetermined interval following each such successive actuation thereby further to extend said go interval.

23. A traffic signal control system comprising a signal device providing stop and go indications for a plurality of intersecting traffic lanes, a rotatable signal program controller having an electric driving motor, means normally energizing said driving motor for continuous rotation thereby continuously to alternate said signals in a pretimed interval sequence, electric braking means for said motor, time element means operable in response to approach of vehicles on a lane having a go indication and within a predetermined interval prior to the normal expiration of said go indication for energizing and successively maintaining the energization of said braking means for one said predetermined interval following each such actuation.

24. A traffic signal control system comprising a signal device providing stop and go indications for each of a plurality of intersecting traffic lanes, a rotatable signal program controller having an electric driving motor, means normally energizing said electric driving motor for continuous rotation thereby continuously to alternate said signals in a normal pretimed sequence, electric braking means for said motor, time element means operable in response to approach of vehicles on a lane having a go indication and within a predetermined interval prior to normal expiration of said go indication for energizing and successively maintaining the energization of said braking means for one said predetermined interval following each such actuation, and second time element means for positively rendering said braking means ineffective after a predetermined maximum permissible right-of-way interval following initiation of said go indication.

25. A vehicle actuated traffic signal control apparatus comprising a signal device providing stop and go indications for each of a plurality of intersecting traffic lanes, a rotatable signal program controller having an electric driving motor, electric braking means for said motor, means for establishing an energizing circuit for said braking means, and means responsive to vehicles approaching said device for controlling said energizing circuit.

26. A vehicle actuated traffic signal control apparatus comprising a signal device providing stop and go indications for each of a plurality of intersecting traffic lanes, a rotatable signal program controller having an electric driving motor, electric braking means for said motor, means establishing an energizing circuit for said braking means, detector means actuable in response to the approach of vehicles on at least one of said lanes, and time element means actuated by said detector means for controlling said energizing circuit.

27. A vehicle actuated traffic signal control apparatus comprising a signal device providing stop and go indications for each of a plurality of intersecting traffic lanes, a rotatable signal program controller having an electric driving motor, electric braking means for said motor, detector means substantially instantaneously responsive to the approach of a vehicle on at least one of said lanes, means including said detector means for establishing an energizing circuit for said braking means, and time element means responsive to actuation of said detector means for controlling said braking circuit.

28. A vehicle actuated traffic signal control apparatus comprising a signal device providing stop and go indications for each of a plurality of intersecting traffic lanes, a rotatable signal program controller having an electric driving motor, electric braking means for said motor, means normally establishing an energizing circuit for said braking means, detector means operable in response to the approach of vehicle on at least one of said lanes for interrupting said braking circuit, time element means controlled by said detector means for controlling said energizing circuit, and means for disconnecting said time element means and simultaneously disabling said braking circuit independently of said detector means, thereby to provide for temporary continuous rotation of said motor and pretimed operation of said controller.

VINCENT W. LEONARD.

REFERENCES CITED

The following references are of record in the file of this patent:

UNITED STATES PATENTS

| Number | Name | Date |
|---|---|---|
| 1,973,563 | Friendly | Sept. 11, 1934 |
| 2,122,410 | Eames | July 5, 1938 |